June 28, 1960  W. R. POLANIN  2,942,697
BRAKE CYLINDER LEVER CONNECTION
Filed Jan. 9, 1956

Witness:
Chas. H. Barrett

INVENTOR.
Walter R. Polanin
BY Walter L. Schlegel, Jr.
Atty.

United States Patent Office 2,942,697
Patented June 28, 1960

2,942,697
BRAKE CYLINDER LEVER CONNECTION
Walter R. Polanin, Chicago, Ill., assignor to American Steel Foundries, Chicago, Ill., a corporation of New Jersey
Filed Jan. 9, 1956, Ser. No. 557,920
1 Claim. (Cl. 188—153)

This invention relates to rotor brakes for railway car trucks and more particularly to a rotor brake arrangement in which a rotor mounted on a wheel and axle assembly is frictionally engaged between a pair of stators to decelerate said assembly.

An object of the invention resides in the provision of a relatively simple, inexpensive and reliable rotor brake arrangement in which a pair of brake levers are mounted for pivotal movement intermediate their ends and are provided with brake-head shoe assemblies to frictionally engage opposite sides of a rotor responsive to the flow of pressure fluid into a duplex brake cylinder.

Another object of the invention resides in the provision of a duplex brake cylinder bored to receive opposed pistons operatively connected to their respective brake levers, the pistons being movable away from each responsive to the introduction of pressure fluid into the cylinder between the pistons, and being movable toward each by means of individual compression springs responsive to exhaust of pressure fluid from the cylinder.

A further object of the invention resides in the provision of a duplex brake cylinder in which the opposed pistons are slidably mounted on opposite ends of a tubular shaft to maintain the pistons in axial alignment within the cylinder bore.

Another object of the invention resides in the provision of a duplex brake cylinder having spiral coil springs seated within opposite ends thereof to engage and yieldably resist outward movement of their respective pistons, the springs normally maintaining the pistons in abutting engagement against opposite ends of a spacing member telescopically mounted on the medial portion of the tubular shaft.

Another object of the invention resides in the provision of a duplex piston-cylinder power means in which the pressure fluid within the cylinder acts against a piston surface having an area equal to the area of the cylinder bore.

Another object of the invention resides in the provision of a duplex piston-cylinder arrangement in which the ends of the cylinder and pistons are interconnected by end walls of flexible sheet material serving to prevent the entrance of moisture, dirt and other foreign material into the cylinder.

Another object of the invention resides in the provision of a rotor brake arrangement in which the outer ends of the pistons are provided with openings to receive the ends of their respective brake levers, whereby the cylinder-piston power means may readily be demounted for inspection and repairs.

The invention embodies other novel features, details of construction and arrangement of parts which are hereinafter set forth in the specification and claim and illustrated in the accompanying drawing, wherein:

Figure 1:
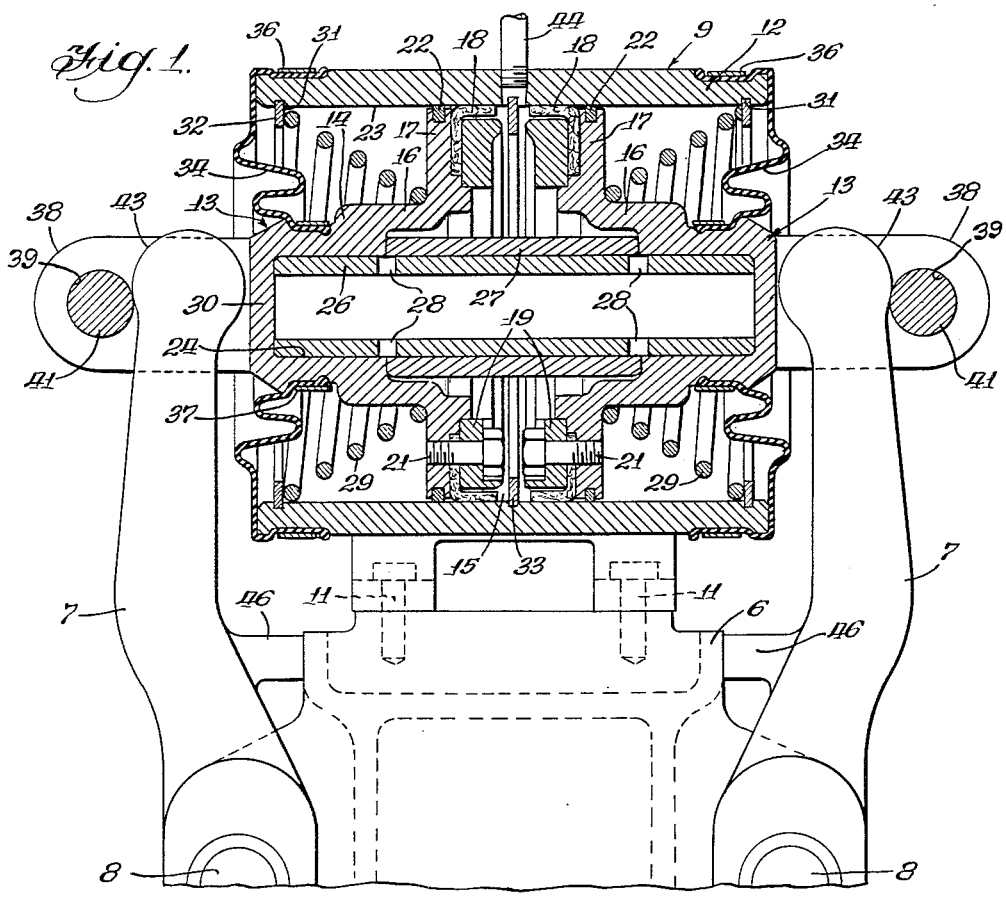
Figure 1 is a fragmentary sectional view illustrating a rotor brake embodying features of the invention.
Figure 2:
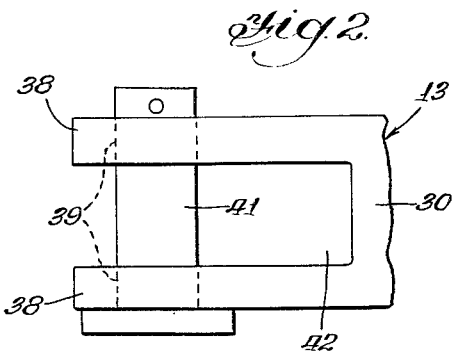
Figure 2 is a fragmentary plan view showing the outer end of a piston.

Referring now to the drawing for a better understanding of the invention, the rotor brake arrangement is shown as comprising a stator support 6 adapted to be mounted upon a railway truck. A pair of brake levers 7—7 are pivotally mounted intermediate their ends at 8—8 upon the support 6 and carry conventional brake head-shoe assemblies (not shown) at their outer ends to frictionally engage opposite sides of a rotor (not shown) associated with a wheel and axle assembly (not shown).

A duplex piston-cylinder power means, indicated generally at 9, is bolted at 11—11 to the stator support 6 to actuate the brake levers 7—7, said means being shown as comprising a cylinder 12 having a pair of identical opposed pistons 13—13 mounted for reciprocative movement therein and defining therewith a pressure chamber 15. Each piston is shown as comprising a hub 14 having a tubular web 16 projecting axially from one end thereof to merge with and support an annular flange 17.

A sealing ring 18 formed of flexible material is secured to the flange 17 by means of a clamping ring 19 and cap screws 21. If desired, studs and nuts may be substituted for the cap screws 21. The flange 17 is also formed with an annular groove to receive a piston ring 22 which coacts with the sealing ring to prevent the passage of fluid between the piston and the bore 23 of the cylinder.

The hubs 14 of the pistons are bored at 24 to slidably receive opposite ends of a tubular guide shaft 26 which serves to maintain the pistons in axial alignment. A tubular abutment member 27 is telescopically mounted on the medial portion of the shaft 26 for abutting engagement against the inner ends of the hubs 14, when the pistons are disposed in their inner or brake release positions. It will be noted that the shaft 26 provides a floating connection between the pistons as it is free to rotate and/or move axially relative to each piston. The shaft 26 is formed with apertures 28, adjacent the ends of the member 27, for the passage of fluid therethrough.

Identical spiral compression springs 29—29 are provided within opposite ends of the cylinder 12 to yieldably resist outward movement of their respective pistons 13—13. One end of each spring 29 is engaged against a shoulder 31 provided on the cylinder, and the other end of the spring is engaged against the piston flange 17. The shoulder 31 may be provided by a groove formed in the cylinder wall, or by a split ring 32 seated within a groove. If desired, a split ring 33 may be mounted in a groove disposed on the transverse center line of the cylinder between the pistons 13—13.

To prevent dirt and other foreign material from entering the ends of the cylinder 12, the cylinder is provided with identical end covers 34—34 formed of flexible material extending between the cylinder and their respective pistons. The outer marginal portions of the end covers are secured to the cylinder by means of clamping rings 36, and the inner marginal portions of the covers are secured to their respective pistons by clamping rings 37.

Each piston 13 is formed with an end wall 30 having spaced outwardly projecting arms 38—38 formed with aligned apertures 39—39 to receive a pin or bolt 41, the arms and pin defining an opening 42 to receive the inner, round end 43 of its respective brake lever 7.

In the operation of the rotor brake arrangement thus shown and described, fluid under pressure is supplied from any suitable source through a conduit 44 into the interior of the cylinder 12 between the pistons 13—13 to move the latter away from each other toward the ends of the cylinder, the pistons acting through their respective levers 7—7 to move their respective brake head-shoe assemblies into frictional engagement against opposite sides of a rotor to decelerate a wheel and axle assembly.

Responsive to a drop in fluid pressure within the cylinder 12, the spiral compression springs 29—29 act to move their respective pistons 13—13 toward each other and thereby pivot the brake levers 7—7 toward their brake release positions. Upon return of the pistons and brake levers to their normal inoperative positions, as illustrated in Figure 1, it will be noted that lugs 46 provided on the levers are urged into abutting engagement against the support 6 by the springs 29—29 to prevent relative movement of the several parts of the brake arrangement responsive to movement of the truck over rough track, thereby reducing noise and wear of parts.

Figure 3:
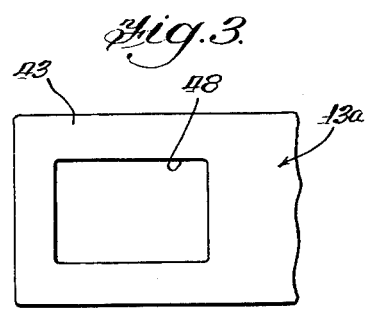
Figure 3 is a fragmentary plan view, corresponding to Figure 2, illustrating a modified form of piston.

Figure 3 in the drawing illustrates a modified form of the invention in which each piston 13a is provided with a arm 47 formed with an opening 48 to receive the rounded inner end 43 of its respective brake lever 7.

It should be noted that sufficient clearance may be provided between the end 43 of brake lever 7 and the opening 42 so as to prevent any binding of end 43 in opening 42 during operation of the duplex power means 9.

By providing means defining openings at the outer ends of the pistons, it will be noted that the power means 9 may readily be removed from the support 6 for inspection and repairs by merely removing the bolts 11.

I claim:
In a brake cylinder-brake lever connection arrangement, the combination of: a power cylinder having extending therefrom a rod comprising a pair of arms extending parallel to each other and to the axis of the rod and being spaced from each other to define therebetween a U-shaped opening open toward the outer end of the rod; a brake lever having a portion received within said opening; and removable pin means operable to interconnect the outer ends of said arms at a location outwardly adjacent said lever portion and thereby retain said lever portion within said opening between said pin means and the inner end of said opening, said opening having a greater inner dimension than the outer dimension of said portion longitudinally of said rod to accommodate lineal movement of the latter within the former without binding.

References Cited in the file of this patent
UNITED STATES PATENTS

| | | |
|---|---|---|
| 709,940 | Thomas | Sept. 30, 1902 |
| 2,118,236 | Schwentler | May 24, 1938 |
| 2,151,843 | Farmer | Mar. 28, 1939 |
| 2,355,123 | Tack et al. | Aug. 8, 1944 |
| 2,737,817 | Harris et al. | Mar. 13, 1956 |